Dec. 19, 1922.
C. F. ROCHEVILLE.
ADJUSTABLE AEROPLANE WING.
FILED JULY 27, 1921.
1,439,127.
2 SHEETS—SHEET 1.
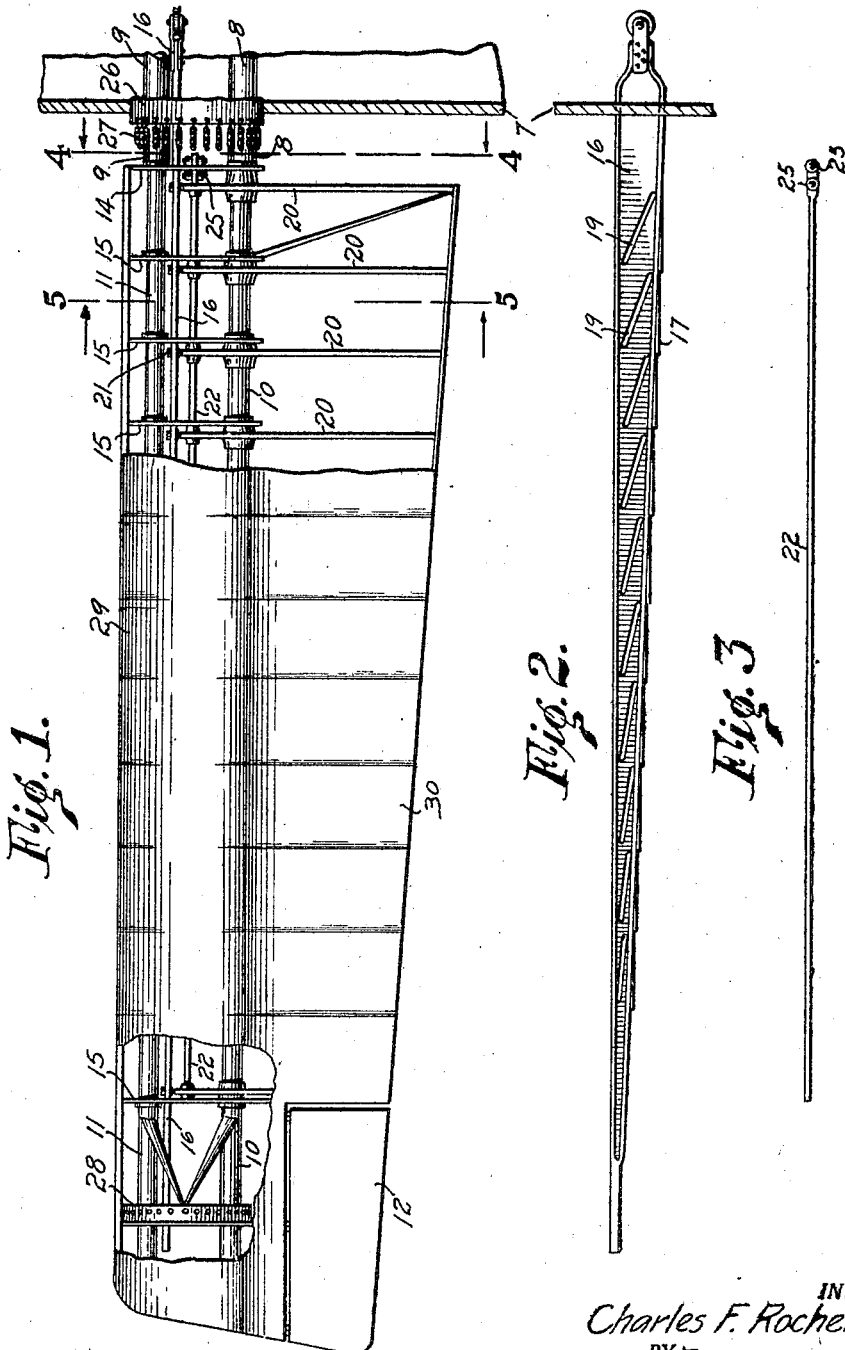
INVENTOR.
Charles F. Rocheville
BY Westall and Wallace
ATTORNEYS.

Dec. 19, 1922.

C. F. ROCHEVILLE.
ADJUSTABLE AEROPLANE WING.
FILED JULY 27, 1921.

1,439,127.

INVENTOR.
Charles F. Rocheville
BY Nestall and Wallace
ATTORNEYS.

Patented Dec. 19, 1922.

1,439,127

UNITED STATES PATENT OFFICE.

CHARLES F. ROCHEVILLE, OF SAN DIEGO, CALIFORNIA, ASSIGNOR TO HARRY K. WEITZEL, OF SAN DIEGO, CALIFORNIA.

ADJUSTABLE AEROPLANE WING.

Application filed July 27, 1921. Serial No. 487,909.

*To all whom it may concern:*

Be it known that I, CHARLES F. ROCHEVILLE, a citizen of the United States, and resident of San Diego, in the county of San Diego, State of California, have invented new and useful Improvements in an Adjustable Aeroplane Wing, of which the following is a specification.

This invention relates to an aeroplane wing and pertains particularly to a wing so constructed that the angle of incidence of the rear or trailing portion of the wing be varied.

A desideratum in aeroplanes is a construction such that the space required for the take-off and landing is small, while the speed when in the air is great. The lift of a plane is dependent upon the angle of incidence. With a large angle of incidence, a large lift is required. However, a large angle of incidence decreases the drift or speed of the plane. My invention contemplates a plane which may be adjusted or warped to provide a large angle of incidence on taking off, then this angle may be decreased to permit speed in flying, and on landing, the angle may again be decreased, which facilitates a slow landing. To this end I provide a plane having a forward or entering edge portion, which is maintained fixed, and a trailing portion which may be moved through a limited angle to vary the angle of incidence.

Figure 4:
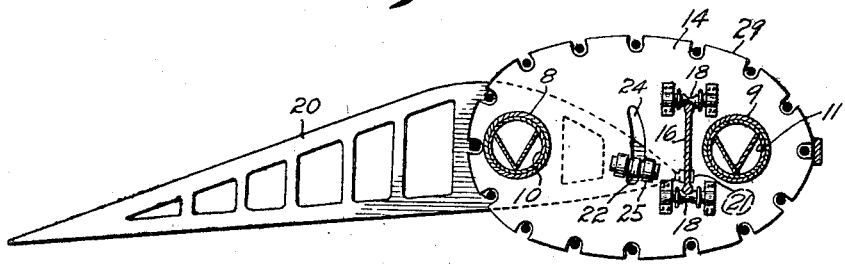
Figure 5:
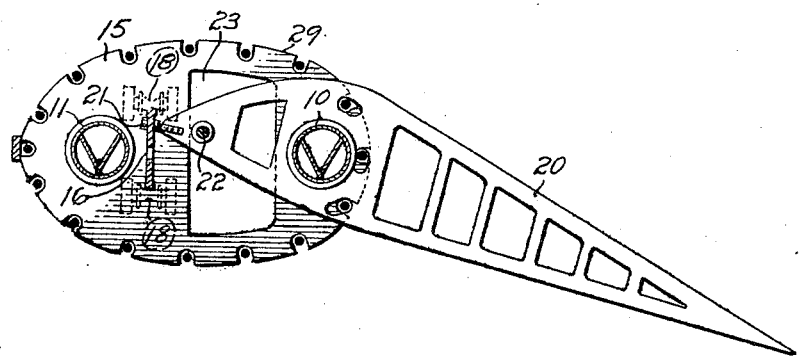
Figure 6:
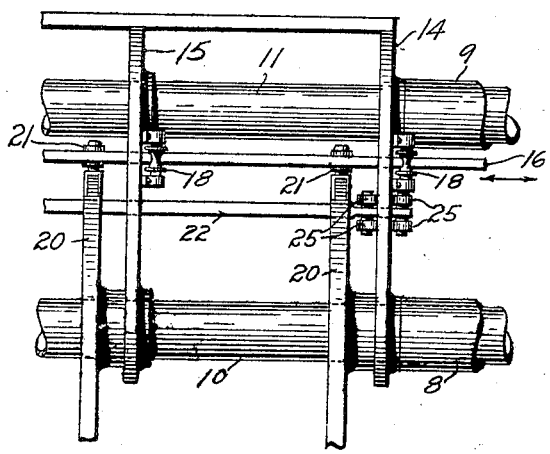

The above mentioned objects together with other objects relating to details of design for securing a simple, easily manipulated, strong structure are obtained by means of the embodiment of my invention illustrated in the accompanying drawings, in which:

Fig. 1 is an elevation of a wing with part of the covering broken away, and a fragment of the fuselage shown in section; Fig. 2 is an elevation of the wing control; Fig. 3 is an elevation of a rib spacing rod; Fig. 4 is an enlarged section taken on the line 4—4 of Fig. 1; Fig. 5 is an enlarged elevation taken on the line 5—5 of Fig. 1; and Fig. 6 is a fragmentary plan view of the inner end of the wing with the covering removed to show details of the structure, whereby it is connected to the fuselage.

Referring more particularly to Fig. 1, a fragment of the fuselage is indicated by 7. Secured thereto are sleeves or spars 8 and 9 to receive rods 10 and 11 forming parts of the wing. The wing shown herein is equipped with a tip 12 to provide for transverse control. However, this forms no feature of my invention. Any other of the well known types of transverse control may be used.

Mounted upon rods 10 and 11 at the inner end is a fixed rib 14. Spaced along the rods are ribs 15. The ribs 15 are fixed in position, and are similar except for their outline, which conforms with the change in shape of the wing from its inner to its outer end. Rib 14 is ellipsoidal in shape, and is fixed to rods 10 and 11 which extend through openings therein. Extending transversely to the major axis of the rib 14 adjacent rod 11 is a wing control member 16, best shown in Fig. 2. The lower edge of the control member is stepped, as indicated by 17 and the member is slidably disposed in the ribs, being mounted upon spool shaped rollers 18 journalled upon the ribs. The control member is provided with inclined slots or ways 19, there being one way for each rib. Pivotally mounted upon the rod 10 are trailing edge ribs 20. There is a trailing edge rib for each fixed rib. Fixed to the forward end of each trailing edge rib is a pintle, upon which is journalled a roller 21 disposed in a way of the control member 16 and maintaining the trailing edge ribs in adjusted position. In order to hold the trailing edge ribs in proper spaced relation with respect to the fixed ribs, a spacing rod 22 is secured adjacent the forward end of each rib. The ribs 15 are provided with openings 23, see Fig. 5, through which the rod 22 extends, thereby permitting a swinging movement of the trailing edge ribs without interference. The rib 14 is provided with an arcuate slot 24, through which the rod 22 extends. Mounted upon the inner end of the spacing rod 22 are rollers 25 engaging opposite sides of rib 14, thereby maintaining the ribs in position with respect to the fixed rib 14. It is obvious that by sliding the control member 16 inwardly and outwardly, the trailing edge ribs will be raised and lowered.

The rods 10 and 11 are slipped into the collars 8 and 9 with the latter abutting rib 14. In order to hold the wing in position on the fuselage, and also to properly brace it, a ring 26 is secured to the fuselage and is provided with openings to which turnbuckles may be secured, the latter being indicated by 27. The ring 26 is substantially of the same peripheral shape as the rib 14. Secured to the rods 10 and 11 at the outer end is an attachment ring 28 of substantially the same shape as the outermost rib 15. This ring 28 is provided with openings, whereby cables may be strung from ring 26 to ring 28, being attached to ring 26 by means of the turnbuckles 27. These cables are not shown in the drawing as they form no part of the invention, but are referred to herein to show a means of bracing the wing and holding the latter in position on the fuselage. The fixed rib portion of the wing is covered by a sheet 29 ending close to the trailing edge rib portion, but permitting rocking movement of the trailing edge ribs. The trailing edge ribs are also covered by a sheet 30, so that the wing in its final form has the ribs entirely covered. It is obvious that the covering 29 and 30 may be of metal.

The control member 16 is connected by any suitable actuating mechanism located conveniently for operation by the aviator. Moving the control member 16 inwardly rocks all of the trailing edge ribs so that the rear edge of the wing is tipped downwardly, and the angle of incidence is increased. In this position the aeroplane is ready to take off. The angle of incidence being great, the lift is relatively great, and a small space is required for ascending. After the aeroplane has reached an elevation suitable for travelling forward, the control member 16 is moved inwardly rocking the trailing edge ribs upwardly so that the angle of incidence is decreased. The aeroplane is now in condition for travelling forward at a high speed. When it is desired to land, the control member is pulled inwardly and the angle of incidence of the wing increased, thereby decreasing the speed of the plane necessary for suspension and permitting landing in a small space.

It is obvious that various mechanical changes may be made in the structure, and especially in the details of design to provide for proper bracing of the wings.

What I claim and desire to secure by Letters Patent is:

1. In an aeroplane, a wing having an entering edge portion fixed, a trailing edge portion having ribs pivotally mounted in the entering edge portion, and an adjustment plate for rocking said ribs simultaneously connected to the nose of said ribs.

2. In an aeroplane, a wing having its entering edge portion fixed, a trailing edge portion having ribs pivotally mounted in the entering edge portion, each of said ribs having a pintle at its nose, and an adjustment plate having inclined ways in which said pintles are disposed, whereby the trailing edge may be warped with respect to the entering edge.

3. In an aeroplane, a wing having its entering edge portion fixed and provided with a spar, a trailing edge portion having ribs pivotally mounted on said spar so as to be warped with respect to the entering edge portion to change the angle of incidence, each of said ribs having a pintle at its nose, and a movable control bar having inclined ways in which said pintles are mounted so as to warp said trailing edge portion.

In witness that I claim the foregoing I have hereunto subscribed my name this 18th day of July, 1921.

CHARLES F. ROCHEVILLE.